United States Patent
Hsu et al.

(10) Patent No.: US 8,023,257 B2
(45) Date of Patent: Sep. 20, 2011

(54) SLIDE MECHANISM FOR SLIDE-TYPE PORTABLE ELECTRONIC DEVICE

(75) Inventors: Che-Yuan Hsu, Taipei Hsien (TW);
Fu-Keng Yang, Taipei Hsien (TW);
Zhi-Gang Zou, Shenzhen (CN);
Zhi-Gang Peng, Shenzhen (CN);
Qing-Ping Tang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 210 days.

(21) Appl. No.: 12/536,309

(22) Filed: Aug. 5, 2009

(65) Prior Publication Data

US 2010/0067179 A1    Mar. 18, 2010

(30) Foreign Application Priority Data

Sep. 12, 2008   (CN) .......................... 2008 1 0304491

(51) Int. Cl.
*G06F 1/16* (2006.01)
(52) U.S. Cl. ........... 361/679.3; 361/679.55; 361/679.56; 312/223.1; 312/223.2; 455/575.4
(58) Field of Classification Search ................ 361/679.3
See application file for complete search history.

(56) References Cited

U.S. PATENT DOCUMENTS

| | | | | |
|---|---|---|---|---|
| 6,073,027 A * | 6/2000 | Norman et al. | ............ | 455/575.4 |
| 6,816,363 B2 * | 11/2004 | Yamamoto | ............. | 361/679.3 |
| 7,286,862 B2 * | 10/2007 | Lee et al. | ............. | 455/575.4 |
| 7,539,527 B2 * | 5/2009 | Jang et al. | ............. | 455/575.3 |
| 7,831,285 B2 * | 11/2010 | Lee | ............. | 455/575.4 |
| 7,907,982 B2 * | 3/2011 | Juan et al. | ............. | 455/575.4 |
| 2003/0050019 A1 * | 3/2003 | Dowling et al. | ............. | 455/90 |
| 2006/0068859 A1 * | 3/2006 | Lee et al. | ............. | 455/575.4 |
| 2008/0039159 A1 * | 2/2008 | Joo et al. | ............. | 455/575.4 |
| 2008/0090627 A1 * | 4/2008 | Jeong et al. | ............. | 455/575.4 |
| 2008/0254844 A1 * | 10/2008 | Lee | ............. | 455/575.4 |
| 2008/0261666 A1 * | 10/2008 | Niitsu et al. | ............. | 455/575.4 |
| 2009/0168339 A1 * | 7/2009 | Lee | ............. | 361/679.56 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A slide mechanism includes a main plate, a slide plate and a driving device, the slide plate slidably engages with the main plate, the driving device for driving the slide plate slide relative to the main plate includes a driving mechanism and a control module electronically connecting the driving mechanism, the driving mechanism is positioned between the main plate and the slide plate, the slide plate slide relative to the main plate by the driving mechanism, which is controlled by the control module. The invention also discloses a portable electronic device applying the slide mechanism.

13 Claims, 7 Drawing Sheets

SLIDE MECHANISM FOR SLIDE-TYPE PORTABLE ELECTRONIC DEVICE

BACKGROUND

1. Technical Field

The present disclosure generally relates to slide mechanisms and, particularly, a sliding mechanism used in portable electronic devices.

2. Description of Related Art

Slide-type portable electronic devices have been increasingly popular among portable electronic devices. The slide-type portable electronic device generally includes two housings and a slide mechanism connected to the two housings. The slide mechanism can drive one of the housings to slide over the other to open/close the portable electronic device.

However, such slide mechanism is typically comprised of elastic components, housings can only slide to open/close positions, and cannot be secured at any intermediate positions during sliding.

Therefore, there is room for improvement within the art.

BRIEF DESCRIPTION OF THE DRAWINGS

Many aspects of the exemplary slide mechanism and a portable electronic device using the slide mechanism can be better understood with reference to the following drawings. The components in the various drawings are not necessarily drawn to scale, the emphasis instead being placed upon clearly illustrating the principles of the slide mechanism and the portable electronic device. Moreover, in the drawings, like reference numerals designate corresponding parts throughout the diagrams.

DETAILED DESCRIPTION OF THE EMBODIMENT

Figure 1:
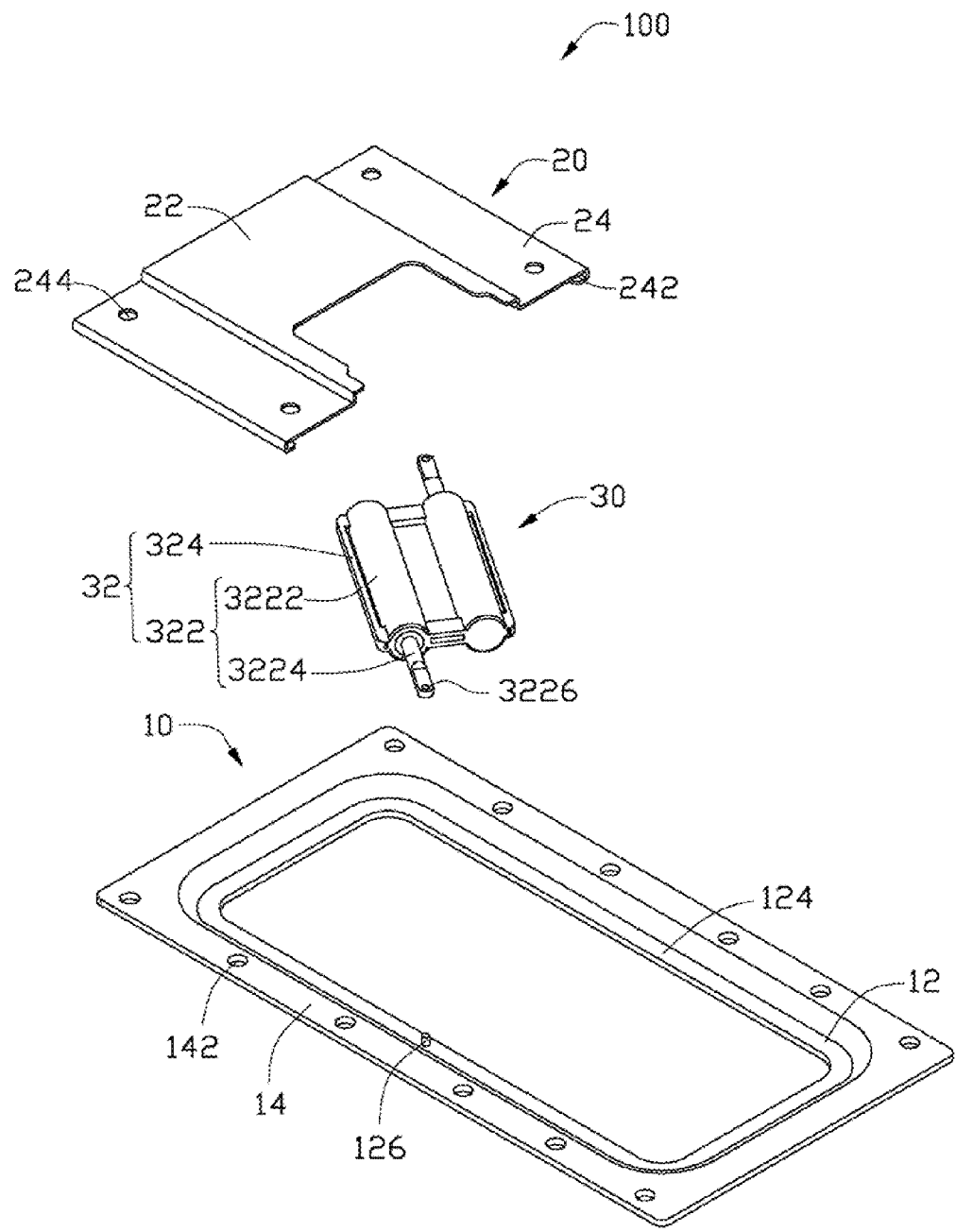
FIG. 1 is a disassembled view of the slide mechanism, according to an exemplary embodiment.

FIG. 1 shows a slide mechanism 100 can be used in a portable electronic device such as a mobile phone, a digital camera, etc.

The slide mechanism 100 includes a main plate 10, a slide plate 20 and a driving device 30 connected with the main plate 10 and the slide plate 20 and used to drive the slide plate 20 sliding relative to the main plate 10.

The main plate 10 is substantially a flat board and forms a recess 12. The recess 12 has a through aperture 122 defined and correspondingly forms a peripheral flange 124 surrounding the aperture 122. The peripheral flange 124 has a first pole 126 protruding therefrom on the side of the main plate 10 and exposed out of the recess 12. The first pole 126 is for fixing to the driving device 30. The main plate 10 includes two longitudinal, planar guiding flanges 14 adjacent to two opposite sides of the recess 12 for slidably engaging with the slide plate 20. The guiding flanges 14 define a plurality of first affixing holes 142 for affixing the main plate 10 to a housing of an electronic device.

Figure 2:
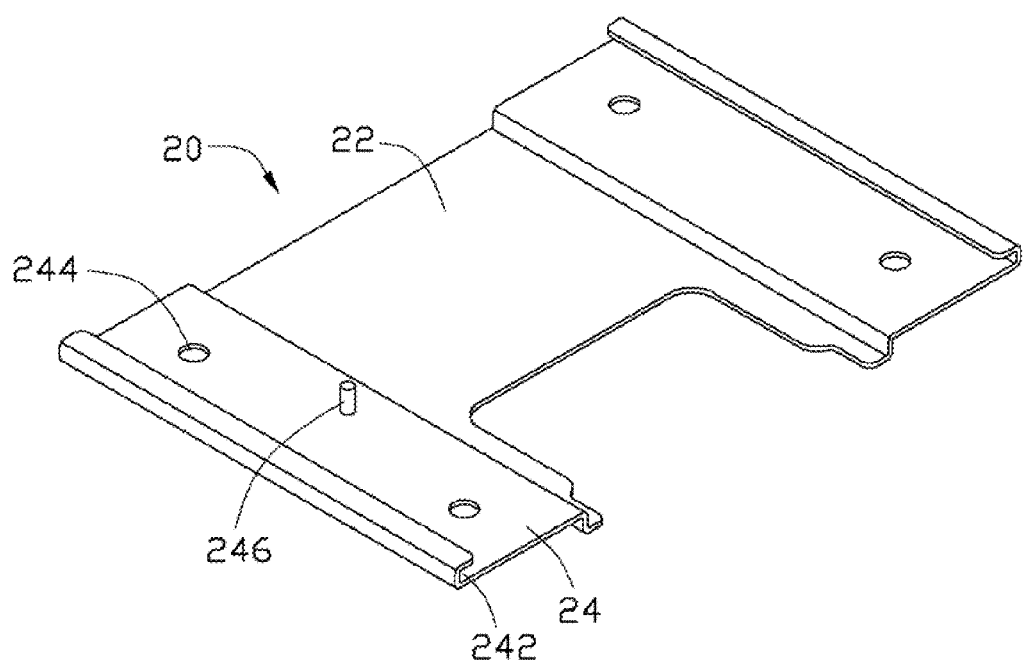
FIG. 2 is an isometric view of a side board of the slide mechanism shown in FIG. 1.

The slide plate 20 includes a protruding portion 22 extending longitudinally and two engaging plate portions 24 oppositely at two sides of the protruding portion 22. The protruding portion 22 has a same width as the recess 12 to engage with the recess 12 to receive the driving device 30 therebetween. Each of the engaging plate portions 24 has a folded flange to define a guiding groove 242 for slidably receiving the corresponding guiding flange 14. The engaging plate portion 24 defines a plurality of second affixing holes 244 for affixing the slide plate 20 to a cover of the electronic device. Referring to FIG. 2, an engaging plate portion 24 has a second pole 246 protruding from its bottom surface, and the second pole 246 is used to fix to the driving device 30.

Figure 4:
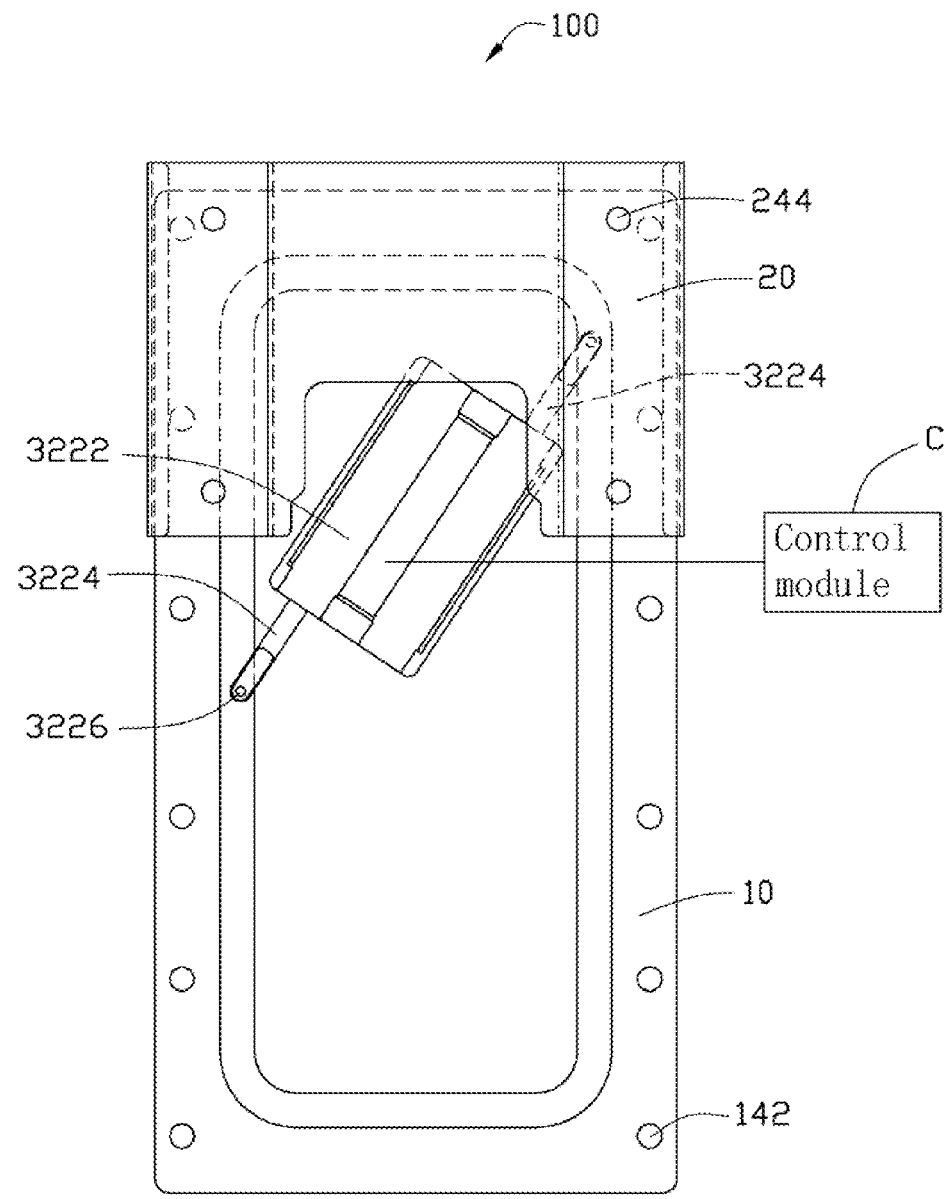
FIG. 4 is a perspective view of the slide mechanism illustrated in FIG. 1 at an opened position.
Figure 5:
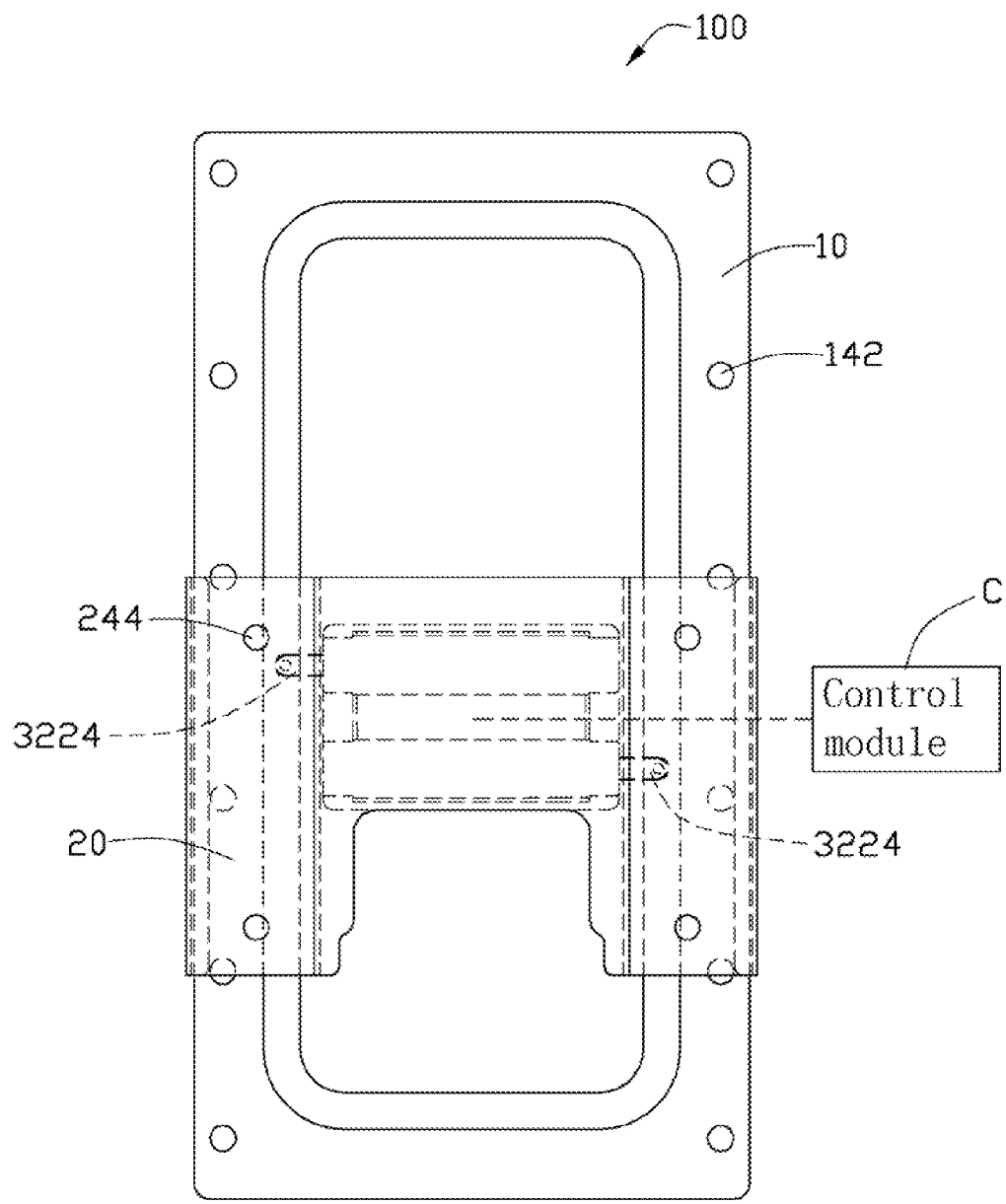
FIG. 5 is similar to FIG. 3, but at a critical position.
Figure 6:
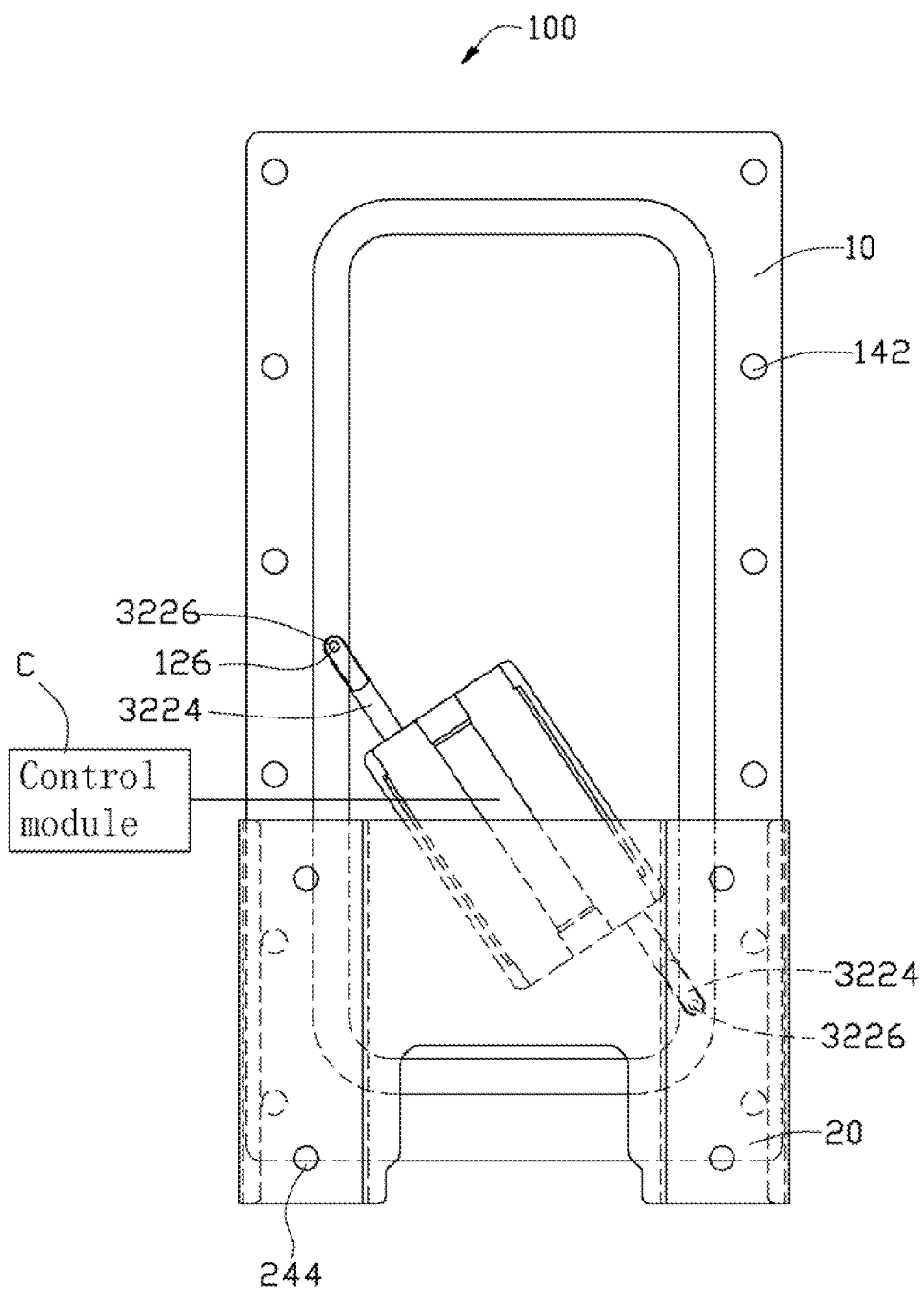
FIG. 6 is similar to FIG. 3, but at a closed position.

The driving device 30 includes a driving mechanism 32 and a control module C electronically connecting to the driving mechanism 32 (FIGS. 4-6). The driving mechanism 32 includes two cylinders 322 and a connecting frame 324 connecting and fixing with the two cylinders 322. Each cylinder 322 includes a cylinder body 3222 and a piston 3224 slidably received inside the cylinder body 3222. The piston 3224 defines a fixing hole 3226 at one end for engaging with the first pole 126 or the second pole 246. The two cylinders 322 are parallelly secured to the connecting frame 324 and the two pistons 3224 reversely extend outwardly in two opposite directions. The control module C can be operated by pressing a button thereof to control gas pressure within the cylinder body 3222 and control movements of the two pistons 3224 within the cylinder body 3222. Accordingly, the two pistons 3224 can simultaneously be extended out or withdrawn from the cylinder bodies 3222.

Figure 3:
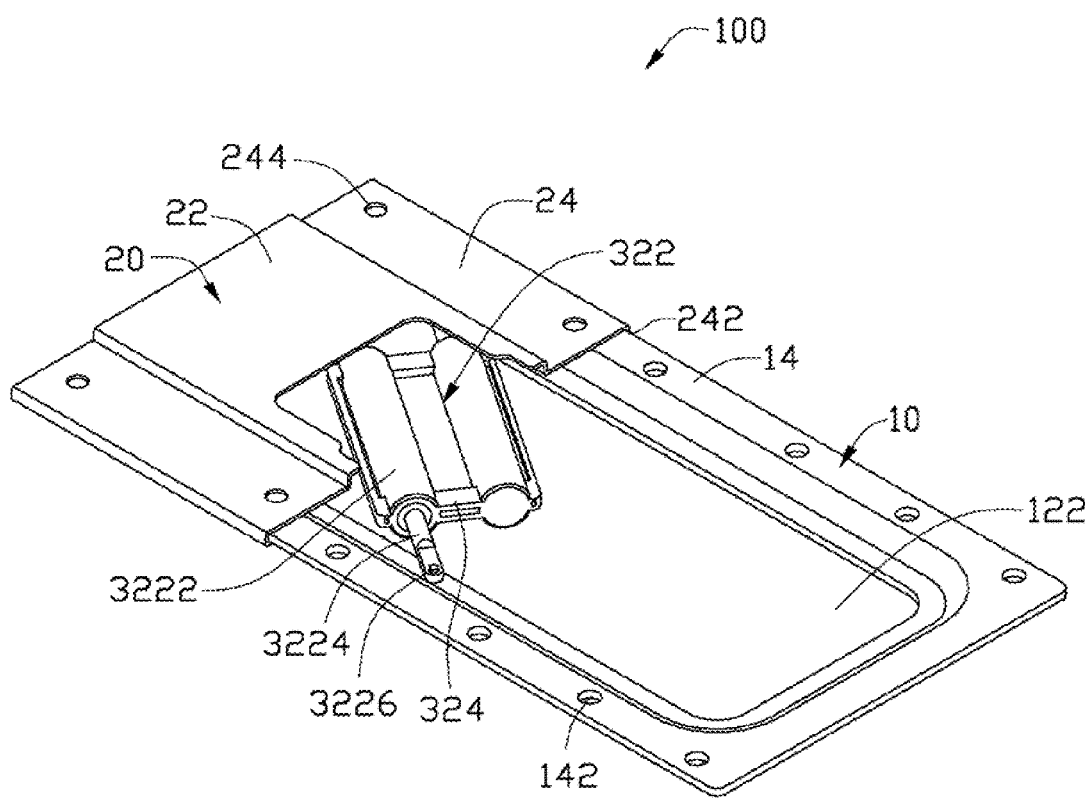
FIG. 3 is an assembled view of the slide mechanism shown in FIG. 1.

Referring to FIG. 3, during assembly, the driving mechanism 32 may be positioned between the main plate 10 and the slide plate 20. The first pole 126 of the main plate 10 is inserted into one fixing hole 3226 of one piston 3224, meanwhile the piston 3224 can rotate about the first pole 126. The second pole 246 of the slide plate 20 is inserted into the other fixing hole 3226 of the other piston 3224, meanwhile the piston 3224 can rotate about the second pole 246. The slide plate 20 slidably engages with the main plate 10, where the two guiding flanges 14 of the main plate 10 slidably engage into the two guiding grooves 242 respectively. The recess 12 of the main plate 10 and the protruding portion 22 encloses a receiving space receiving the driving device 30 therein.

Referring to FIG. 4 through FIG. 6, to manipulate the slide mechanism 100, the slide plate 20 is located at an end of the main plate 10. The two pistons 3224 are in a maximally elongated state and cross skewed with the guiding flanges 14 of the main plate 10. The control module C works to adjust the gas pressure of the cylinder bodies 3222 to withdraw the two pistons 3224 into the cylinder bodies 3222 by pressing its button. Due to securing to the piston 3224, the slide plate 20 moves longitudinally relative to the main plate 10. When the slide plate 20 reaches the middle of the main plate 10, the two pistons 3224 are located perpendicular to the sliding direction of the slide plate 20. After passing over the middle of the main plate 10, the two pistons 3224 extend out from the cylinder bodies 3222, until the slide plate 20 reaches the other end of the main plate 10. At this position, the pistons 3224 are again in the maximally elongated state. It is to be understood that the slide plate 20 can be stopped at the any positions with respect to the main plate 10 by controlling of the control module.

Figure 7:
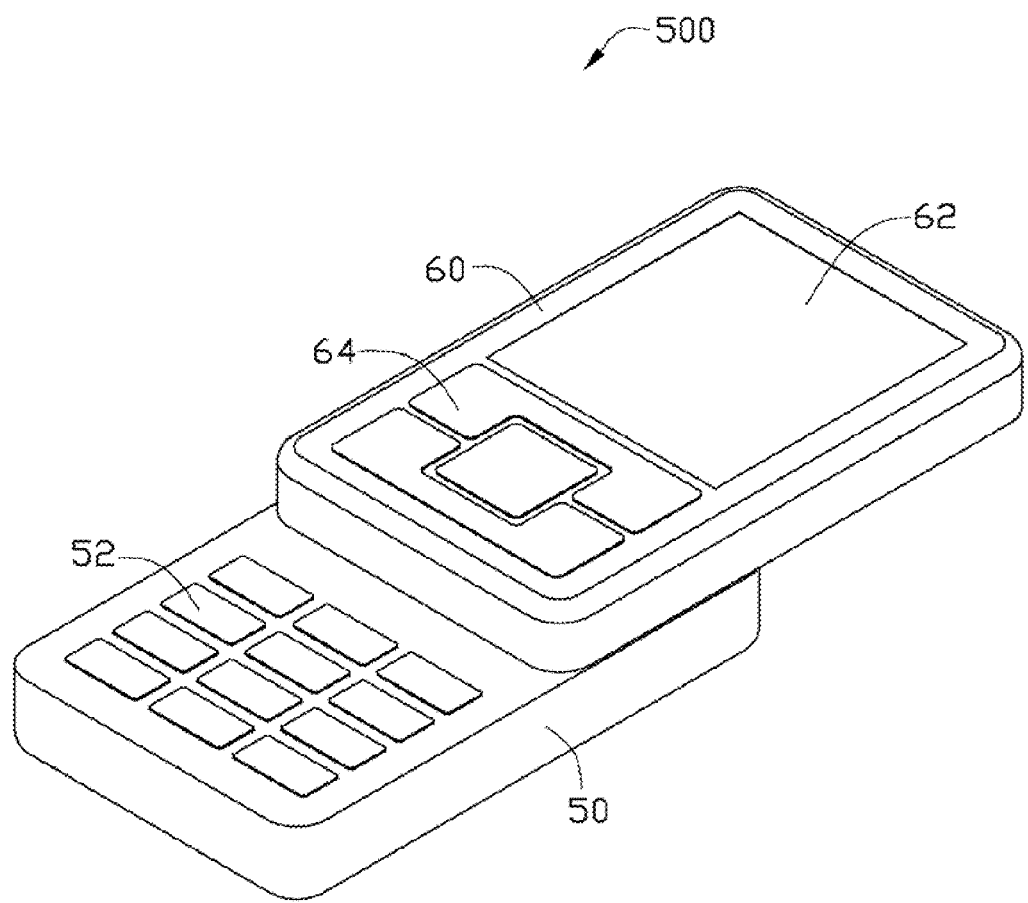
FIG. 7 is an isometric view of a portable electronic device at an opened state and using the slide mechanism.

Referring to the FIG. 7, by applying the slide mechanism 100 to a portable electronic device 500, the cover 60 is fixed with the slide plate 20, the housing 50 is fixed with the main plate 10. The housing 50 and the cover 60 can be slidable with each other by the sliding mechanism 100. From FIG. 7, the housing 50 has a keypad 52, the cover 60 has a display 62 and function keys 64. Thus, the keypad 52 can be exposed or covered by the sliding of the cover 60 over the housing 50.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A slide mechanism, comprising:
a main plate;
a slide plate slidably engaged with the main plate; and
a driving device for driving the slide plate slide relative to the main plate,
wherein the driving device includes a driving mechanism and a control module electronically connecting the driving mechanism, the driving mechanism includes at least one cylinder, each cylinder including a cylinder body and a piston slidably assembled in the cylinder body, the driving mechanism is positioned between the main plate and the slide plate and connects the main plate and the slide plate respectively, the slide plate slides relative to the main plate by the driving mechanism, which is electronically controlled by the control module to control gas pressure within the cylinder body and movements of the piston within the cylinder body.

2. The slide mechanism as claimed in claim 1, wherein the driving mechanism includes two cylinders and a connecting frame fixing with the two cylinders, the two cylinders are parallel and toward reverse directions respectively.

3. The slide mechanism as claimed in claim 2, wherein the piston defines a fixing hole to connect with the main plate or slide plate.

4. The slide mechanism as claimed in claim 3 wherein the main plate forms a recess defined an aperture and correspondingly formed a peripheral flange surrounding the aperture, the peripheral flange forms a first pole to engage with the fixing hole of the driving mechanism.

5. The slide mechanism as claimed in claim 3 wherein the slide plate forms a protruding portion and two engaging plate portions at two side of the protruding portion, one of the engaging plate portions forms a second pole to engage with the fixing hole of the driving mechanism.

6. The slide mechanism as claimed in claim 5 wherein each engaging plate portion forms a guiding groove, the main plate forms two guiding flanges to engage with the guiding grooves respectively.

7. A portable electronic device, comprising:
a housing;
a cover; and
a slide mechanism engaged with the cover and housing and configured to drive the cover to slide relative to the housing,
wherein the sliding mechanism comprises:
a main plate fixed with the housing;
a slide plate fixed with the cover and slidably engaged with the main plate; and
a driving device for driving the slide plate slide relative to the main plate, the driving device including a driving mechanism and a control module electronically connecting the driving mechanism, the driving mechanism including at least a cylinder, each cylinder including a cylinder body and a piston slidably assembled in the cylinder body, the driving mechanism positioned between the main plate and the slide plate and connecting the main plate and the slide plate respectively, the slide plate sliding relative to the main plate by the driving mechanism, which is controlled by the control module to control gas pressure within the cylinder body and movements of the piston within the cylinder body.

8. The portable electronic device as claimed in claim 7 wherein the main plate defines a plurality of first affixing holes to connect the cover, the slide plate defines a plurality of second affixing holes to connect the housing.

9. The portable electronic device as claimed in claim 7, wherein the driving mechanism includes two cylinders and a connecting frame fixing with the two cylinders, the two cylinders are parallel and toward reverse directions respectively.

10. The portable electronic device as claimed in claim 9, wherein the piston defines a fixing hole to connect with the main plate or slide plate.

11. The portable electronic device as claimed in claim 10 wherein the main plate forms a recess defined an aperture and formed a peripheral flange surrounding the aperture, the peripheral flange forms a first pole to engage with the fixing hole of the driving mechanism.

12. The portable electronic device as claimed in claim 10 wherein the slide plate forms a protruding portion and two engaging plate portions at two side of the protruding portion, one of the engaging plate portions forms a second pole to engage with the fixing hole of the driving mechanism.

13. The portable electronic device as claimed in claim 12 wherein each engaging plate portion forms a guiding groove, the main plate forms two guiding flanges to engage with the guiding grooves respectively.

* * * * *